UNITED STATES PATENT OFFICE.

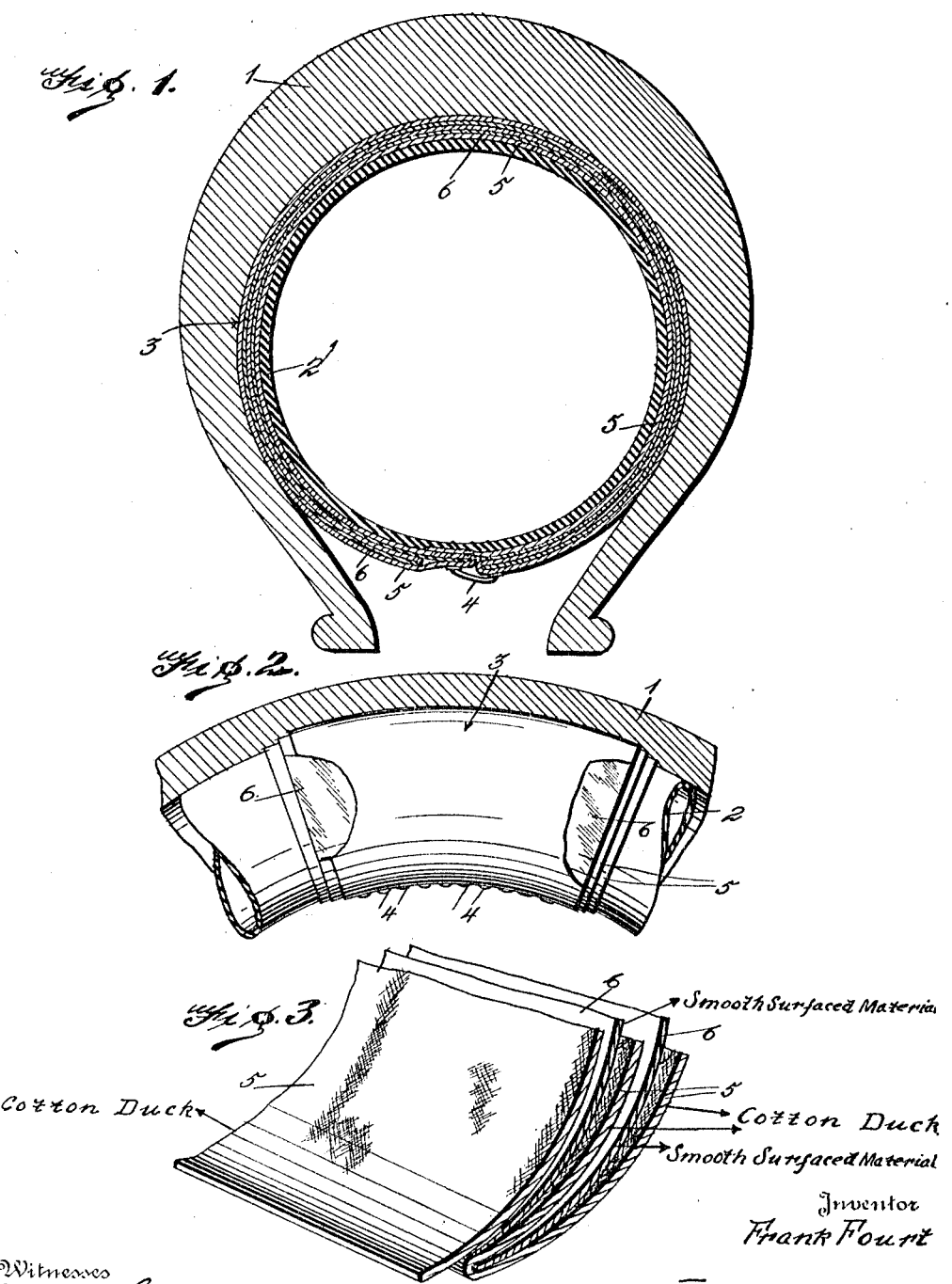

FRANK FOURT, OF FAIRFIELD, IOWA.

BLOW-OUT HOLDER.

1,120,045. Specification of Letters Patent. Patented Dec. 8, 1914.

Application filed March 28, 1914. Serial No. 827,907.

*To all whom it may concern:*

Be it known that I, FRANK FOURT, a citizen of the United States, residing at Fairfield, in the county of Jefferson and State of Iowa, have invented certain new and useful Improvements in Blow-Out Holders, of which the following is a specification, reference being had therein to the accompanying drawing.

This invention relates to tire protectors and has special reference to a blow-out holder for pneumatic tires, and has for its object the production of an efficient holder which may be readily secured around the inner tube of the tire and is prevented from being forced through the hole in the casing from any force within.

Another object, and a very important one in the present invention, is the production of an efficient means for preventing the friction of the several layers of the blow-out holder while the tire is in operation.

The present invention is an improvement upon my previous patent, bearing No. 1,075,345, issued October 14, 1913.

With these and other objects in view this invention consists of certain novel combinations, constructions and arrangements of parts as will be hereinafter fully described and claimed.

In the drawings:—Figure 1 is a transverse sectional view through the tire showing the device applied to the inner tube thereof. Fig. 2 is a longitudinal section through a portion of the tire showing the blow-out holder secured to the inner tube. Fig. 3 is a detailed perspective view of one end of the blow-out holder showing the manner in which the friction reducing material is placed between the layers of the protecting fabric of the blow-out holder.

By referring to the drawings it will be seen that 1 designates the tire tread or outer casing of the tire in which is placed the usual inner tube 2. The blow-out holder 3 is carried upon the tube 2 and has its free ends preferably secured together by means of a lacing 4 similar to that illustrated and described in my previous patent bearing Serial No. 1,075,345. The holder 3 comprises a plurality of layers of thick fabric such as cotton duck 5 and between each of the layers of thick fabric is placed a piece of sheet metal, paper, buckram, smooth surfaced material 6 such as glazed cloth, celluloid, or any other kind of pliable material, having a smooth surface to allow the rough or heavy duck to rub against the same without causing considerable friction, as would be the case if this smooth surfaced material were not placed between the several layers of canvas or duck.

It should be understood that in the ordinary patch which is now employed considerable friction occurs between the several layers of canvas thereby producing considerable heat which, of course, is injurious to the soft rubber inner tube and to the device. By placing the smooth surfaced material in between the several layers of protector cloth such as heavy duck, the friction is reduced to the minimum, owing to the fact that the several layers of heavy cloth will easily slide over the smooth surface material 6 as is illustrated in Fig. 3.

It should be understood that a very simple and efficient device has been produced, whereby the friction occuring between the several layers of fabric has been reduced to a minimum, thereby greatly increasing the life of the blow-out holder, as well as increasing the life of the outer casing 1 and inner tube 2.

What is claimed, is:—

1. A device of the class described comprising a plurality of layers of heavy cloth, and a pliable smooth surfaced sheet placed between each layer of heavy cloth for reducing the friction between said layers to the minimum.

2. A device of the class described comprising a plurality of layers of heavy protector cloth, and a friction reducing sheet comprising a smooth surfaced material placed between each layer of protector cloth for reducing the friction between said layers of protector cloth to a minimum.

In testimony whereof I hereunto affix my signature in presence of two witnesses.

FRANK FOURT.

Witnesses:
J. S. MCKERNEY,
BLANCHE TURNER.

Copies of this patent may be obtained for five cents each, by addressing the "Commissioner of Patents, Washington, D. C."